(12) United States Patent
Moffie et al.

(10) Patent No.: US 11,949,667 B2
(45) Date of Patent: Apr. 2, 2024

(54) MASKING COMPOSITE PAYLOADS USING POLICY GRAPHS

(71) Applicant: International Business Machines Corporation, Armonk, NY (US)

(72) Inventors: Micha Gideon Moffie, Zichron Yaakov (IL); Ariel Farkash, Shimshit (IL)

(73) Assignee: International Business Machines Corporation, Armonk, NY (US)

( * ) Notice: Subject to any disclaimer, the term of this patent is extended or adjusted under 35 U.S.C. 154(b) by 387 days.

(21) Appl. No.: 17/355,420

(22) Filed: Jun. 23, 2021

(65) Prior Publication Data

US 2023/0006983 A1 Jan. 5, 2023

(51) Int. Cl.
*H04L 9/40* (2022.01)
*G06F 16/901* (2019.01)

(52) U.S. Cl.
CPC ...... *H04L 63/0478* (2013.01); *G06F 16/9024* (2019.01); *H04L 63/0414* (2013.01); *H04L 63/20* (2013.01)

(58) Field of Classification Search
CPC . H04L 63/0478; H04L 63/0414; H04L 63/20; G06F 16/9024; G06F 16/986
USPC ........................................................ 713/168
See application file for complete search history.

(56) References Cited

U.S. PATENT DOCUMENTS

| | | | |
|---|---|---|---|
| 2016/0283729 A1 | 9/2016 | Vidhani et al. | |
| 2018/0253562 A1 | 9/2018 | Antonatos et al. | |
| 2018/0293403 A1 | 10/2018 | Cheng et al. | |
| 2019/0052819 A1 | 2/2019 | Pogorelik et al. | |
| 2019/0327271 A1* | 10/2019 | Saxena | H04L 41/0895 |
| 2020/0175202 A1* | 6/2020 | Burnett | G06F 16/1794 |
| 2020/0334219 A1 | 10/2020 | Antonatos et al. | |

FOREIGN PATENT DOCUMENTS

| | | |
|---|---|---|
| CN | 108830827 A | 11/2018 |
| CN | 112054902 A | 12/2020 |
| WO | 2014138769 A1 | 9/2014 |

OTHER PUBLICATIONS

Peter Mell et al., "The NIST Definition of Cloud Computing", National Institute of Standards and Technology, Special Publication 800-145, Sep. 2011, Gaithersburg, MD, 7 Pages.
International Search Report dated Jul. 28, 2022, International Application No. PCT/IB2022/054601, 8 Pages.
Data Redaction (DBMS_REDACT) in Oracle Database 12c Release 1 (12.1), https://oracle-base.com/articles/12c/data-redaction-12cr1 <Retrieved from the internet on Nov. 9, 2023>.

(Continued)

*Primary Examiner* — Kambiz Zand
*Assistant Examiner* — Aubrey H Wyszynski
(74) *Attorney, Agent, or Firm* — Donald J. O'Brien

(57) ABSTRACT

An example system includes a processor to receive a graph-based masking policy and a composite payload containing a data object to be masked. The processor is to instantiate a masking engine based on the graph-based masking policy. The processor is to execute the masking engine on the composite payload to generate a masked payload comprising a masked data object. The data object to be masked is masked in place such that the resulting composite payload type is maintained. The processor is to output the masked payload.

25 Claims, 8 Drawing Sheets

(56) References Cited

OTHER PUBLICATIONS

Mishra, P., et al. (2020). Node Masking: Making Graph Neural Networks Generalize and Scale Better. ArXiv, abs/2001.07524.
Redaction (redact) IBM Documentation, updated Jun. 28, 2023, https://www.ibm.com/docs/en/api-connect/5.0.x?topic=policies-redaction-redact <Retrieved from internet on Nov. 9, 2023>.

* cited by examiner

MASKING COMPOSITE PAYLOADS USING POLICY GRAPHS

BACKGROUND

The present techniques relate to masking data. More specifically, the techniques relate to masking elements of data payloads.

Masking tools may usually receive a policy specifying the rules to identify a sensitive or confidential element such as XML Path Language (XPath) describing context or the surrounding structure, or a regular expression pattern corresponding to a payload type describing specific content, or the element to be masked itself. The policy may also specify the masking operation to perform such as redact, tokenize, encrypt, etc. In addition, the policy may also specify a payload type to be parsed and traversed, if more than one is supported. Many existing solutions provide the user the means to specify what and how to mask in a given payload with a specific format. For example, such solutions may provide a user to mask a row in a comma-separated files (CSV) table. However, in many use cases, the payload itself is more complex. For example, a CSV exported from a database may also contain an Extensible Markup Language (XML) object. In another example, a Hypertext Markup Language (HTML) file may contain a Java Script Object Notation (JSON) object in a specific location. Existing solutions do not address composite payloads. For example, the existing alternatives may treat the top most layer of the payload according to its type and the inner layers as text. If the inner layer has structure, the structure may be treated as text and rules will be hard coded.

SUMMARY

According to an embodiment described herein, a system can include processor to receive a graph-based masking policy and a composite payload containing a data object to be masked. The processor can also further instantiate a masking engine based on a graph-based masking policy. The processor can also execute the masking engine on the composite payload to generate a masked payload including a masked data object; where the data object to be masked is masked in place such that the resulting composite payload type is maintained. The processor can then output the masked payload. Thus, the system can enable data objects to be masked in composite payloads while maintaining the payload type in the masked composite payload. Preferably, a validity of the composite payload type is maintained in the masked payload after masking the data object. In this embodiment, the system may enable format restrictions of the composite payload time may be maintained. Preferably, the composite payload includes a number of data different data types. In this embodiment, the system enables multiple data types to be supported. Optionally, the composite payload includes a number of nested payload types. In this embodiment, the system enables nesting of data types. Preferably, the masking engine includes a number of data processors coupled to a number of selectors, where each of the data processors is configured to process a particular type of data in a predetermined manner and each of the selectors is configured to identify to an associated data processor a relative location of a portion of the composite payload to be extracted at the associated data processor. In this embodiment, the system enables any combination of different data types inside of a composite payload to be processed. Preferably, an identification of the data object to be masked in the composite payload is based on a series of context identification selectors, content identification selectors, or a combination of both. In this embodiment, the system enables data objects to be identified using any combination of selectors. Preferably, each node in the graph-based masking policy handles a different data layer of the composite payload and corresponds to a data processor in the masking engine. In this embodiment, the system enables a graph-based masking policy to be used to generate a masking engine. Preferably, a first data processor of the masking engine is connected to a second data processor processing a lower layer of the composite payload via a selector that provides the first data processor a specified relative path for a payload portion to be extracted. In this embodiment, the system enables portions of the composite payload to be processed more efficiently by the second data processors instead of the entire composite payload at the second data processor. Preferably, each edge in the graph-based masking policy corresponds to a selector in the masking engine that receives a payload portion of the composite payload from a previous node and transmits a sub-portion of the received payload portion to a subsequent node, and receives in return, from the subsequent node, a corresponding masked sub-portion of the payload portion and replaces the masked sub-portion in place to create a masked payload portion to transmit back to the previous node. In this embodiment, the system enables payload portions of different data types to be efficiently processed by different data processors. Optionally, the masking engine includes a masking processor coupled to a data processor, where the masking processor is to receive the data object from the data processor, mask the data object, and transmit the data object back to the data processor for masking in place in a portion of the composite payload processed by the data processor. In this embodiment, the system enables masking of data objects in composite payloads. Optionally, the executed masking engine is to perform a number of masking actions on the data object. In this embodiment, the system enables any number of masking actions to be performed on a data object. Optionally, the executed masking engine is to perform a masking action on a number of data objects. In this embodiment, the system enables any number of data objects to be masked in the composite payload. Preferably, an order of processing, selection and masking is to be determined based on the graph-based masking policy. In this embodiment, the system enables processing, selection and masking to be specified in the graph-based masking policy. Optionally, a processing flow of the masking engine is controlled based on a received external parameter. In this embodiment, the system enables control of processing flow via the external parameter. Optionally, a processing flow of the masking engine is controlled based on a received payload-specific parameter. In this embodiment, the system enables control of processing flow via the payload-specific parameter. Optionally, the processing flow of the masking engine is controlled based on a combination of a received payload-specific parameter and a received external parameter. In this embodiment, the system enables control of processing flow via an external parameter and a payload-specific parameter.

According to another embodiment described herein, a method can include receiving, via a processor, a graph-based masking policy and a composite payload containing a data object to be masked. The method can further include instantiating, via the processor, a masking engine based on the graph-based masking policy. The method can also further include executing, via the processor, the masking engine on the composite payload to generate a masked payload including a masked data object, where the data object to be masked is masked in place such that the resulting composite payload type is maintained. The method can also include outputting, via the processor, the masked payload. Thus, the method can enable data objects to be masked in composite payloads while maintaining the payload type in the masked composite payload. Preferably, generating the masking engine includes configuring the masking engine to process the composite payload at a root node to parse the composite payload based on the type of the data of the composite payload and extract a relevant portion of the composite payload to a subsequent data processor based on information provided by a coupled selector. In this embodiment, the method enables a data object in the extract relevant portion to be processed by another data processor that is configured to process a different payload type. Optionally, generating the masking engine includes configuring the masking engine to extract a relevant portion of the composite payload based on a location of the data object to be masked using context based detection. In this embodiment, the method enables context based detection of data objects in the composite payload. Optionally, generating the masking engine includes configuring the masking engine to extract a relevant portion of the composite payload based on a structure of the data object using content based detection. In this embodiment, the method enables content based detection of data objects in the composite payload. Preferably, generating the masking engine includes configuring the masking engine to mask a data segment received from a data processor at a masking processor of the masking engine and transmit a masked data segment to the data processor for replacement in place of the data segment. In this embodiment, the method enables masking of data objects in composite payloads. Preferably, generating the masking engine includes configuring the masking engine to receive at each data processor of the masking engine a returned masked value from a subsequently coupled selector and replace in place a previously selected data of the data segment processed at each data processor with the returned masked value. In this embodiment, the method enables a data object within an inner layer of a composite payload to be masked. Optionally, executing the masking engine generates a masked payload including a number of masked data objects. In this embodiment, the method enables a number of masked data objects to be masked at the same time.

According to another embodiment described herein, a computer program product for masking composite payloads can include computer-readable storage medium having program code embodied therewith. The computer readable storage medium is not a transitory signal per se. The program code executable by a processor to cause the processor to receive a graph-based masking policy and a composite payload containing a data object to be masked. The program code can also cause the processor to initiate a masking engine based on the graph-based masking policy. The program code can also cause the processor to execute the masking engine on the composite payload to generate a masked payload including a masked data object, where the data object to be masked is masked in place such that the resulting composite payload type is maintained. The program code can also cause the processor to output the masked payload. The program code can thus enable data objects to be masked in composite payloads while maintaining the payload type in the masked composite payload. Preferably, the program code can also cause the processor to configure the masking engine to process the composite payload at a root node to parse the composite payload based on the type of the data of the composite payload and extract a relevant portion of the composite payload to a subsequent data processor based on information provided by a coupled selector. In this embodiment, the coupled selector may provide a means for identifying the relevant portion of the composite payload including the object to be masked.

DETAILED DESCRIPTION

Figure 1:
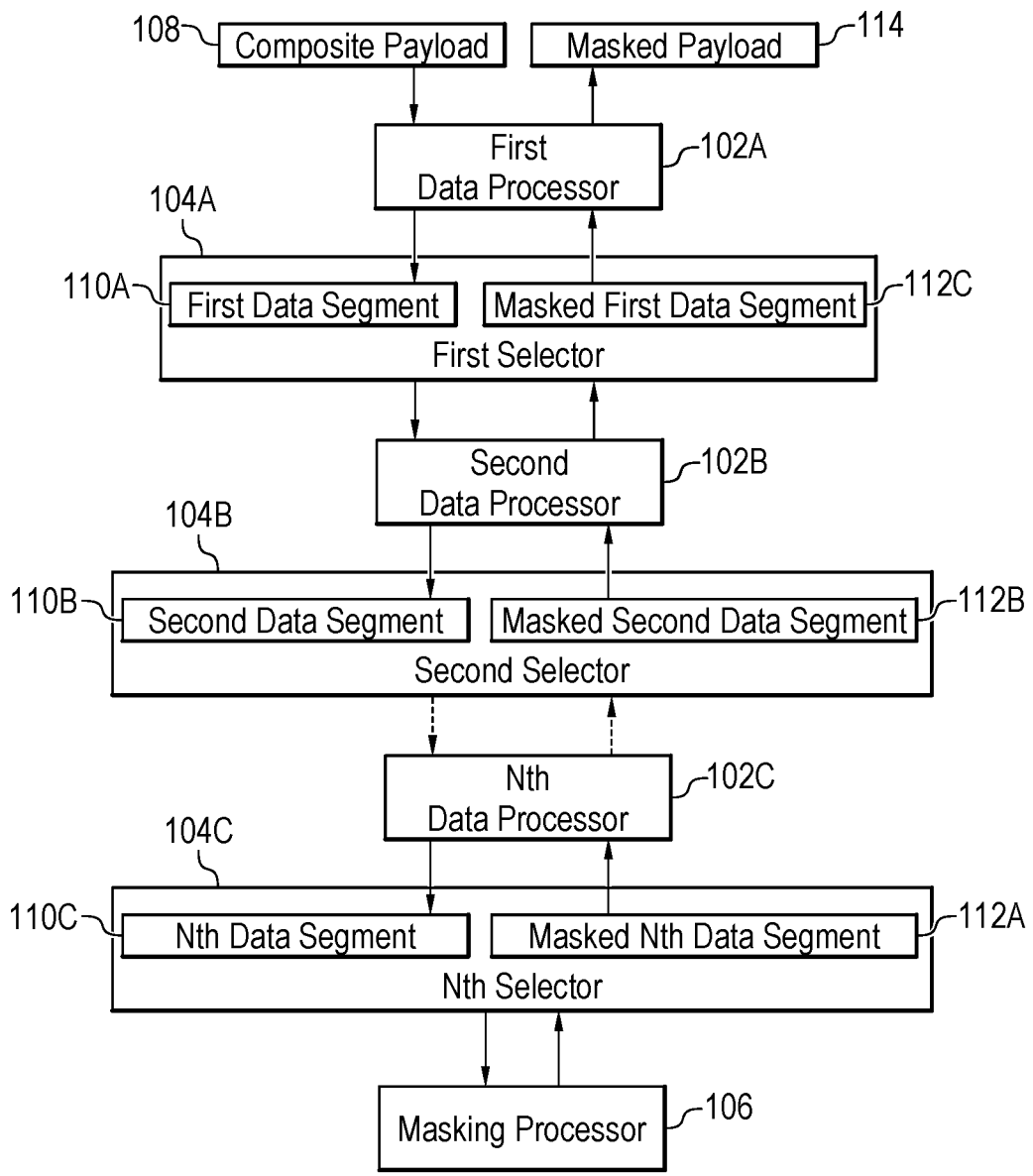
FIG. 1 is a block diagram of an example masking engine for masking composite payloads generated using graph-based masking policies.

According to embodiments of the present disclosure, a system can include a processor to receive a graph-based masking policy and composite payload containing a data object to be masked. The processor can instantiate a masking engine based on the graph-based masking policy. For example, the graph-based masking policy may be a payload processing template that can be used to mask all payloads that have the same structure. In particular, the masking engine can include a combination of data processors and selectors configured based on the graph-based masking policy. As used herein, a data processor an element responsible for processing a specific type or kind of payload with a predefined functionality. For example, a data processor can be responsible to parse a JSON payload, or to encrypt a text. A selector, as used herein, refers to an element that provides the means to specify how to select a certain data element. For example, a selector can contain an XPath identifying an element in XML, or can contain a regular expression. The processor can execute the masking engine on the composite payload to generate a masked payload including a masked data object. The data object to be masked is masked in place such that the resulting composite payload type is maintained. The processor can then output the masked payload. Thus, embodiments of the present disclosure enable the ability to support multiple payload types, including structured, semi-structured, unstructured, and composite formats, in a flexible and reusable way. For example, structured payload types may include CSV and similar formats. In various examples, semi-structured payload types may include JSON or XML, and similar formats. Unstructured payload types may include text. Composite formats may include any combination of payload types, such as a JSON element within HTML. The embodiments provide a configurable system for masking payloads. For example, the graph-based masking policy and masking engine allows for configuration of any order and combination of nesting, supporting any payload type, regardless of the processing depth, while matching on each edge a payload related location specification without modification of code. Furthermore, the embodiments enable the use of any nesting depth, allowing all payload types in each level and provides a means to specify the relative location in the traversal path that corresponds to the payload type.

Moreover, the embodiments described may process composite payloads more efficiently because only a portion of the payload processed at one data processor is selected to be processed at the next data processor. Thus, the embodiments may be more efficient than methods in which the entire composite payload is processed at each and every one of a number of processing components. The embodiments enable cross composite control flow using expressions, which enables the embodiments to control the processing of one data processor based on processing results of another data processor. As one example, based on a value of a field found in an HTML tag, the embodiments may mask another field contained in a JSON data element within another HTML tag. For example, the value of the field may be a Boolean value and the JSON data element may be a name of a person.

With reference now to FIG. 1, a block diagram shows an example system for masking composite payloads using graph-based masking policies. The example system is generally referred to by the reference number 100. The system 100 can be implanted using the method 300 of FIG. 3 using the processor 404 of computing device 400 or the processor 702 of FIGS. 4 and 7.

The system 100 of FIG. 1 includes a first data processor 102A coupled to a second data processor 102B via a first selector 104A. The system 100 also includes an Nth data processor 102C coupled to the second data processor 102B via a second selector 104B. For example, the Nth data processor 102C and the second data processor 102B may have any number of additional data processors and data selectors coupled in between as indicated by ellipses. The system 100 also includes a masking processor 106 coupled to the Nth data processor 102C via an Nth selector 104C. The system 100 includes a composite payload 108. In various examples, the composite payload 108 may be composed of a number of different data types. For example, the data types may include XML, HTML, Text, JSON, among other suitable data types. The system 100 includes a first data segment 110A. For example, the first data segment 110A may be a subset of the composite payload 108. The system 100 includes a second data segment 110B. For example the second data segment 110B may be a subset of the first data segment 110A. The system 100 also further includes a third data segment 110C. For example, the third data segment 110C may be a subset of the second data segment 110B. In some examples, the Nth data segment 110C may be a specific data object to be masked. The system 100 also includes a masked Nth data segment 112A. For example, the masked Nth data segment 112A may be a redaction, an encryption, or a tokenization of the Nth data segment 110C. The system includes a masked second data segment 112B. For example, the masked second data segment 112B may be the second data segment 110B including the masked Nth data segment 112A instead of the third data segment 110C. The system 100 also includes a masked first data segment 112C. For example, the masked first data segment 112C may be the first data segment 110A including the masked second data segment 112B instead of the second data segment 110B. The system 100 also further includes a masked payload 114. For example, the masked payload 114 may be similar to the composite payload 108, but including the masked first data segment 112C instead of the first data segment 110A.

In the example of FIG. 1, the first data processor 102 receives a composite payload 108 and outputs a masked payload 114 that has a target data object masked. For example, the target data object may be encrypted according to an encryption algorithm and may be thus decrypted using an encryption key. In some examples, the target data object may be redacted. For example, the string corresponding to the target data object may be replaced with asterisks or any other symbols. In some examples, the target data object may be replaced with a token. For example, the token may be a randomized value within a particular domain of values.

Still referring to FIG. 1, the first data processor 102A, the second data processor 102B, and the Nth data processor 102C may each be associated with and able to process a different data type. In various examples, the first data processor 102A, the second data processor 102B, and the Nth data processor 102C may process a flow of data where each data processor handles one aspect of the payload and postpones the rest of the processing for the next data processors. In some examples, two or more of the data processors may be associated with the same particular data type. As one example, the first data processor 102A may be associated with a particular data type and the Nth processor 102C may also be associated with the same data type. The second data processor 102B may be able to process a second data type. Thus, the different data type may be the first data segment 110A extracted from the composite payload 108 via the first processor and processed by the second data processor 102B to extract the second data segment 110B containing a data object to be masked. The Nth data processor 102C can extract the data object from the data segment and transmit the data object as Nth data segment 110C to the masking processor 106. The masking processor 106 can then mask the data object and return a masked data object as the masked Nth data segment 112A.

In various examples, each of the first data processor 102A, the second processor 102B, and the Nth data processor 102C can receive a masked data segment and mask in place a data segment with the masked data segment. For example, the Nth data processor 102C may receive the masked Nth data segment 112A and a portion of the second data segment 110B corresponding to the Nth data segment 110C with the masked Nth data segment 112A to generate a masked second data segment 112B.

The second data processor 102B may similarly receive the masked second data segment 112B from the Nth data processor 102C via the second selector 104B. The second data processor 102B can replace the second data segment 110B in the first data segment 110A with the masked second data segment 112B to generate the masked first data segment 112C. The second processor can then send the masked first data segment 112C to the first selector 104A to transmit the masked first data segment 112C to the first data processor 102A.

The first data processor 102A can then replace the first data segment 110A in the composite payload 108 with the masked first data segment 112C to generate the masked payload 114. The masked payload 114 may then be output. For example, the masked payload 114 may be output to an application or other computing system (not shown).

In various examples, the system 100 may be configured using a masking library that includes two components. For example, the first component may be a masking engine that is responsible to process the payload and execute the data flow. The second component may be a policy engine that is responsible for instantiating the masking engine discussed herein based on a masking policy provided by the user. For example, the policy graph may be a directed acyclical graph as shown in the different example of FIG. 1B.

In various examples, a masking policy may indicate both where the target data objects to be processed reside within the composite payload, as well as what to do with the target data objects. Target data items to be extracted and masked may be detected by their structure, their location, or both their structure and location, in the composite payload. Target data items may be detected based on their structure using content based detection. For example, content based detection may be performed using a construct called a data classifier. The data classifier can contain either a regular expression or group of regular expressions, a text or group of text elements to match against by simple identity, or a piece of code which can describe the exact constraints that a data item needs to contain. Alternatively, or in addition, a context based detection may be performed when it is possible to identify a data item based on its relative location in a payload. For example, this might mean an XPath in an XML document, or more visually, a column in a table as seen it an application screen. As discussed above, composite payloads may be more complex and contain composite formats. Detecting target data objects in composite formats can be achieved by using multiple layers of context or content based detection.

Once the data items have been identified and selected, a particular action may then be executed. For example, the masking policy may indicate whether the target data objects should be removed, tokenized or encrypted. In particular, there are several types of masking transformations such as redaction, encryption, tokenization, etc. The masking policy may thus also specify actions to be taken by the masking engine on any number of target objects.

As one particular example, the composite payload 208 handled by the system 100 may be:

```
<?xml version="1.0" encoding="utf-8"?>
<partial-response>
... <update ...>
    <![CDATA[
        <table ..> ...
            <td ...">Name</td>
            <td ..."> john doe</td>
        ..
        <script .. type="text/javascript"> ..
            Object.func("..Button",...,
                {id:"12345678",widget:".."});
        .. </script>
        ..</table> ]]>
    </update> ...
</partial-response>
``` where the name "john doe", as bolded above for reference, is to be masked. In this example, the received graph-based masking policy is configured to mask the name in the HTML table, "john doe" in the above payload. First, the processor should to parse XML, select XPath (e.g. "/partial-response/changes/update"). Then the processor should parse HTML, and select CSS (e.g. "table>tbody>tr>td:nth-child(2)"). The processor should then mask the selected content. In the payload above, the name "john doe" will be masked. The processor should then rebuild the HTML with updated text, and then rebuild the XML with updated HTML element.

Thus, in this example, a policy engine may configure the system 100 to include a first data processor 102A that is an XML processor that parses XML payloads, support XPath Syntax expressions to select XML nodes and supports updating of selected nodes. The policy engine may further configure system 100 to include a second data processor 102B that is an HTML processor that parses HTML payload, supports Cascading Style Sheets (CSS) Syntax and selectors as well as support updating of selected elements. In this example, the Nth data processor 102C is not included. The policy engine may also configure the system 100 with a masking processor 106, which is able to mask text. For example, the masking processor 106 may be able to replace text with an asterisk symbol '*'. In addition, the policy engine may configure system 100 to include a first selector 104A that is an XPath selector that specifies the relevant XPath, and a second selector 104B that is a CSS selector that specifies the relevant CSS path. The masking engine may be executed on the composite payload to mask the name "john doe".

It is to be understood that the block diagram of FIG. 1 is not intended to indicate that the system 100 is to include all of the components shown in FIG. 1. Rather, the system 100 can include fewer or additional components not illustrated in FIG. 1 (e.g., additional composite payloads, data processors, data selectors, data segments, masked data segments, masking processors, or additional masked payloads, etc.). For example, the example system 100 is shown in a simple form, and depending on the particular composite payload 108 received, the system 100 may be reconfigured to include any combination of various data processors for various data types present in the composite payload 108. In various examples, multiple data processors can be coupled to a single data processor via a number of selectors, as described using nodes and directed edges in FIG. 2B.

Figure 2A:
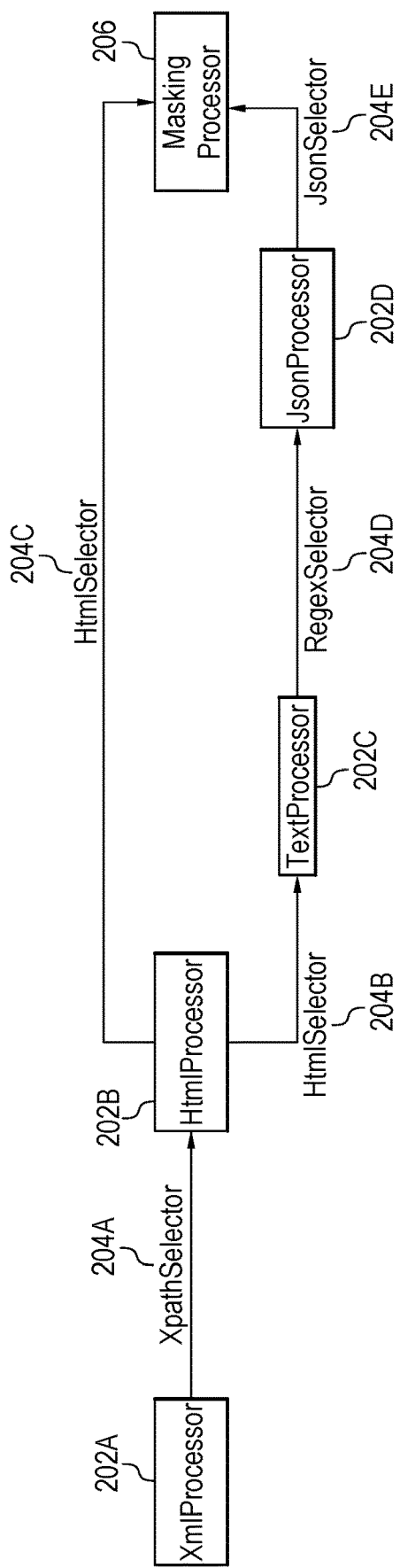
FIG. 2A is an example graph-based masking policy used to generate a masking engine for masking composite payloads.

FIG. 2A is an example graph-based masking policy used to generate a masking engine for masking composite payloads. In various examples, the graph-based masking policy can be received by the processor 402 or the processor 702 of FIGS. 4 and 7.

The example graph-based masking policy 200A of FIG. 2 includes a node representing XML data processor 202A coupled to a node representing an HTML data processor 202B via a directed edge representing an Xpath selector 204A. The graph-based masking policy 200A also includes a node representing text data processor 202C coupled to the HTML data processor 202B via a directed edge representing HtmlScript selector 204B. The graph-based masking policy 200A also includes a node representing a JSON data processor 202D coupled to the text data processor 202C via a directed edge representing a regular expression selector 204C. The graph-based masking policy 200A also includes a node representing a masking processor 206 coupled to the JSON data processor 202D via a directed edge representing a JSON ID selector 204D and to the HTML data processor 202B via a directed edge representing an HTML Owner Selector 204E. The graph-based masking policy 200A also further includes a redacted payload 210. For example, the masked payload 210 may be similar to the composite payload 208, but including a masked owner name and a masked ID number.

In the example of FIG. 2A, the XML data processor 202A is configured to receive a composite payload and eventually output a masked payload that has target data objects masked. In various examples, the composite payload may be composed of a number of different data types. For example, as shown in FIG. 2A, the data types of composite payload 208 may include XML, HTML, Text, and JSON data types. In some examples, other data types may be included, such as Comma Separated Values (CSV), various word processing file types, etc. In the example of FIG. 2A, the root node represents XML data processor 202A because the outer payload type of the composite payload is XML. As one specific example, the received composite payload may be:

"John (3212149056)". In addition, the last row in the table contains a script, which also contains the same id of "3212149056" within a JSON snippet.

In the example of FIG. 2A, a graph-based masking policy 200A may be received to process the payload using an XmlProcessor and select the CDATA using the "/partial-response/changes/update/text( )" Xpath. The graph-based

```
<partial-response>
  <changes>
    <update id="dialogForm:output"><![CDATA[
      <table id="dialogForm:output" class="ui-panelgrid ui-widget" role="grid">
        <tbody>
          <tr class="ui-widget-content" role="row">
            <td role="gridcell" class="ui-panelgrid-cell label">Type</td>
            <td role="gridcell" class="ui-panelgrid-cell value">2572</td>
          </tr>
          <tr class="ui-widget-content" role="row">
            <td role="gridcell" class="ui-panelgrid-cell label">Model</td>
            <td role="gridcell" class="ui-panelgrid-cell value">B6V</td>
          </tr>
          <tr class="ui-widget-content" role="row">
            <td role="gridcell" class="ui-panelgrid-cell label">Serial</td>
            <td role="gridcell" class="ui-panelgrid-cell value">V8XN757</td>
          </tr>
          <tr class="ui-widget-content" role="row">
            <td role="gridcell" class="ui-panelgrid-cell label">OEM</td>
            <td role="gridcell" class="ui-panelgrid-cell value">not exist</td>
          </tr>
          <tr class="ui-widget-content" role="row">
            <td role="gridcell" class="ui-panelgrid-cell label">Description</td>
            <td role="gridcell" class="ui-panelgrid-cell value"></td>
          </tr>
          <tr class="ui-widget-content" role="row">
            <td role="gridcell" class="ui-panelgrid-cell label">Owner</td>
            <td role="gridcell" class="ui-panelgrid-cell value">John (3212149056)</td>
          </tr>
          <tr class="ui-widget-content" role="row">
            <td role="gridcell" class="ui-panelgrid-cell label">Host</td>
            <td role="gridcell" class="ui-panelgrid-cell value"></td>
          </tr>
          <tr class="ui-widget-content" role="row">
            <td role="gridcell" class="ui-panelgrid-cell label">Comments</td>
            <td role="gridcell" class="ui-panelgrid-cell value">
              <input id="dialogForm:j_id1539686477_5bc5c710" name="dialogForm:j_id1539686477_5bc5c710"
                type="text" value=""/>
            </td>
          </tr>
          <tr class="ui-widget-content" role="row">
            <td role="gridcell" class="ui-panelgrid-cell label">
              <button id="dialogForm:j" name="dialogForm:j"
                class="ui-button ui-widget ui-state-default ui-corner-all ui-button-text-only"
                onclick="" type="submit">
                <span class="ui-button-text ui-c">Update comments</span>
              </button>
              <script id="dialogForm:j" type="text/javascript">
PrimeFaces.cw("CommandButton","widget_dialogForm_j",{id:"3212149056",widgetVar:"widget_dialogForm"});
              </script>
            </td>
          </tr>
        </tbody>
      </table>
    ]]>
    </update>
    <update id="javax.faces.ViewState">
NX/CpYYsE+66fuO8UiLLEstPRmaOtdUGbZtlA7N++XZUf6abpacpRsQ5WKGS9vDakUxhTBVXFq39fdHj6Z5F
8MwGEcu0ltdoZYILdvLfeRMSYEy3WC3FzhxhtWA=
    </update>
  </changes>
</partial-response>
```

The composite payload in the above example includes a top level XML segment containing a CDATA node. This CDATA node, which cannot be parsed using Xpath, is an HTML segment containing a table. The table itself further contains several rows, one of which contains a name+id masking policy 200A also specifies to process the selected data using an HtmlProcessor and select the $6^{th}$ row/$2^{nd}$ column (Owner name) using the "table>tbody>tr:nth-child(6)>td:nth-child(2)" CSS for the name+Id. The graph-based masking policy 200A may also specify, for the id in the script function, to select the content of the script tag in last row using the "table>tbody>tr:nth-child(9)>td>script" CSS, to process the script body as text and select the JSON snippet using a simple regular expression: "\{.*\}", and process the snippet as JSON and select the id using the "$.id" JSON path. The graph-based masking policy 200A may also further specify to redact the value by replacing it with "*". This graph-based masking policy 200A may be used to automatically generate a masking engine.

Still referring to FIG. 2A, an outer layer of the composite payload 208 may thus be an XML layer, therefore the masking engine may include an XML data processor 202A to handle XML data. The graph-based masking policy 200A may also therefore include an Xpath Selector 204A to select a particular location inside the XML and indicate a data segment to be extracted from the composite payload 208. The graph-based masking policy 200A also includes an HTML data processor 202B to handle HTML data. The graph-based masking policy 200A includes an HtmlSelector used to select the $6^{th}$ row/$2^{nd}$ column (Owner name) using the "table>tbody>tr:nth-child(6)>td:nth-child(2)" CSS for the name+Id. The graph-based masking policy 200A also includes the HtmlSelector 204B to select the content of the script tag in last row using the "table>tbody>tr:nth-child(9)>td>script" CSS.

In various examples, the policy graph 200 is used to generate a masking engine. For example, the specification of the graph-based masking policy 200A may be the following:

```
{
    "version": "1.0",
    "graph": {
        "nodes": [
            {
                "id": "Redact",
                "root": false
            },
            {
                "id": "XmlProcessor",
                "root": true
            },
            {
                "id": "HtmlProcessor"
            },
            {
                "id": "TextProcessor"
            },
            {
                "id": "JsonProcessor"
            }
        ],
        "edges": [
            {
                "source": "XmlProcessor",
                "target": "HtmlProcessor",
                "selector": "XpathSelector"
            },
            {
                "source": "HtmlProcessor",
                "target": "Redact",
                "selector": "HtmlOwnerSelector"
            },
            {
                "source": "HtmlProcessor",
                "target": "TextProcessor",
                "selector": "HtmlScriptSelector"
            },
            {
                "source": "TextProcessor",
                "target": "JsonProcessor",
                "selector": "RegexSelector"
            },
            {
                "source": "JsonProcessor",
```

-continued

```
                "target": "Redact",
                "selector": "JsonIdSelector"
            }
        ]
    },
    "processors": [
        {
            "id": "Redact",
            "type": "RedactProcessor",
            "loggable": true,
            "configuration": {
                "charMask": "*",
                "prefix": "",
                "suffix": ""
            }
        },
        {
            "id": "XmlProcessor",
            "type": "XmlProcessor",
            "loggable": true
        },
        {
            "id": "HtmlProcessor",
            "type": "HtmlProcessor",
            "configuration": { },
            "loggable": true
        },
        {
            "id": "TextProcessor",
            "type": "TextProcessor",
            "loggable": true
        },
        {
            "id": "JsonProcessor",
            "type": "JsonProcessor",
            "loggable": true
        }
    ],
    "selectors": [
        {
            "id": "XpathSelector",
            "type": "XpathSelector",
            "configuration": {
                "xpath": "/partial-response/changes/update/text( )"
            },
            "loggable": true
        },
        {
            "id": "HtmlOwnerSelector",
            "type": "CssSelector",
            "configuration": {
                "css": "table > tbody > tr:nth-child(6) > td:nth-child(2)"
            },
            "loggable": true
        },
        {
            "id": "HtmlScriptSelector",
            "type": "CssSelector",
            "configuration": {
                "css": "table > tbody > tr:nth-child(9) > td > script"
            },
            "loggable": true
        },
        {
            "id": "RegexSelector",
            "type": "RegexSelector",
            "configuration": {
                "regex": "\\{.*\\}",
                "classification": ""
            },
            "loggable": true
        },
        {
            "id": "JsonIdSelector",
            "type": "JsonPathSelector",
            "configuration": {
                "jpath": "$.id"
            },
            "loggable": true
```

-continued

```
    }
  ],
  "expressions": [ ],
  "formats": [ ]
}
```

In various examples, the masking engine described above may be executed on the example composite payload described above to output the masked payload with masked portions replaced by asterisks:

FIG. 2A. Rather, the graph-based masking policy 200A can include fewer or additional components not illustrated in FIG. 2A (e.g., additional composite payloads, data processors, data segments, masked data segments, masking processors, or additional masked payloads, etc.). For example, depending on the particular composite payload 208 received, the graph-based masking policy 200A may be reconfigured to include any combination of various data processors for various data types present in the composite payload 208 to redact any number of target data objects. In some examples, the masking processor 206 may alternatively be an encrypting processor or a tokenizing processor.

```
<partial-response>
    <changes>
        <update id="dialogForm:output"><![CDATA[<table id="dialogForm:output" class="ui-panelgrid ui-widget" role="grid">
    <tbody>
    <tr class="ui-widget-content" role="row">
        <td role="gridcell" class="ui-panelgrid-cell label">Type</td>
        <td role="gridcell" class="ui-panelgrid-cell value">2572</td>
    </tr>
    <tr class="ui-widget-content" role="row">
        <td role="gridcell" class="ui-panelgrid-cell label">Model</td>
        <td role="gridcell" class="ui-panelgrid-cell value">B6V</td>
    </tr>
    <tr class="ui-widget-content" role="row">
        <td role="gridcell" class="ui-panelgrid-cell label">Serial</td>
        <td role="gridcell" class="ui-panelgrid-cell value">V8XN757</td>
    </tr>
    <tr class="ui-widget-content" role="row">
        <td role="gridcell" class="ui-panelgrid-cell label">OEM</td>
        <td role="gridcell" class="ui-panelgrid-cell value">not exist</td>
    </tr>
    <tr class="ui-widget-content" role="row">
        <td role="gridcell" class="ui-panelgrid-cell label">Description</td>
        <td role="gridcell" class="ui-panelgrid-cell value"></td>
    </tr>
    <tr class="ui-widget-content" role="row">
        <td role="gridcell" class="ui-panelgrid-cell label">Owner</td>
        <td role="gridcell" class="ui-panelgrid-cell value">*****************</td>
    </tr>
    <tr class="ui-widget-content" role="row">
        <td role="gridcell" class="ui-panelgrid-cell label">Host</td>
        <td role="gridcell" class="ui-panelgrid-cell value"></td>
    </tr>
    <tr class="ui-widget-content" role="row">
        <td role="gridcell" class="ui-panelgrid-cell laber>Comments</td>
        <td role="gridcell" class="ui-panelgrid-cell value"> <input id="dialogForm:j_id1539686477_5bc5c710" name="dialogForm:j_id1539686477_5bc5c710" type="text" value=""> </td>
    </tr>
    <tr class="ui-widget-content" role="row">
        <td role="gridcell" class="ui-panelgrid-cell label"> <button id="dialogForm:j" name="dialogForm:j" class="ui-button ui-widget ui-state-default ui-corner-all ui-button-text-only" onclick="" type="submit">
<span class="ui-button-text ui-c">Update comments</span> </button> <script id="dialogForm:j" type="text/javascript">PrimeFaces.cw("CommandButton","widget_dialogForm__j",{"id":"***********","widgetVar":"widget_dialogForm"});</script> </td>
    </tr>
        </tbody>
</table>]]>
        </update>
        <update id="javax.faces.ViewState"><html>
    <head/>
    <body>
NX/CpYYsE+66fuO8UiLLEstPRmaOtdUGbZtlA7N++XZUf6abpacpRsQ5WKGS9vDakUxhTBVXFq39fdHj6Z5F8MwGEcu0ltdoZYILdvLfeRMSYEy3WC3FzhxhtWA=
    </body>
</htmlx/update>
    </changes>
</partial-response>
```

Thus, the name+id's are redacted using asterisks, as specified in the received graph-based masking policy 200A.

Figure 2B:
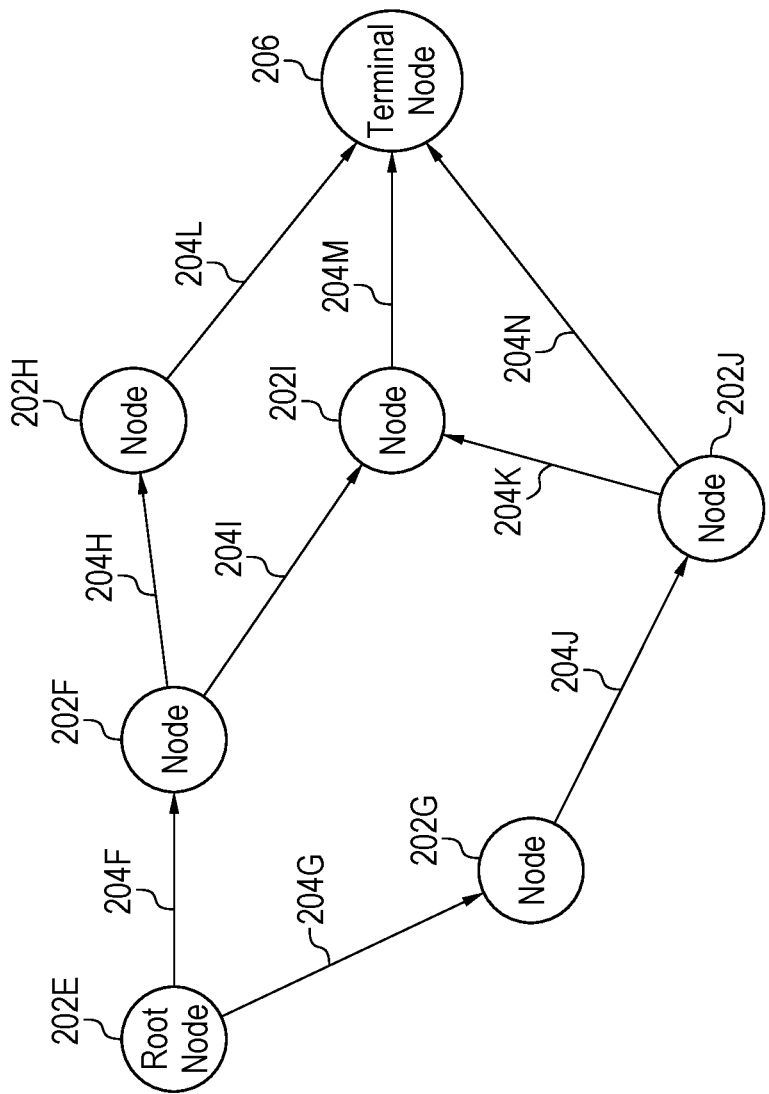
FIG. 2B is an example graph-based masking policy used to generate a masking engine for masking composite payloads.

It is to be understood that the block diagram of FIG. 2A is not intended to indicate that the graph-based masking policy 200A is to include all of the components shown in FIG. 2A. Rather, the graph-based masking policy 200A can FIG. 2B is a graph-based masking policy used to generate a masking engine for masking composite payloads. In various examples, the graph-based masking policy can be received by the processor 402 or the processor 702 of FIGS. 4 and 7.

The graph-based masking policy 200B includes a data flow implemented as a directed acyclic graph. For example, the graph-based masking policy 200B is a graph with directed edges and no cycles. In various examples, the graph elements of a graph-based masking policy 200B may be mapped to design entities as follows: each node in the graph corresponds to a single data processor, each directed edge in the graph between two nodes corresponds to a selector and an optional expression. The expression may be optional on the edge, and may be next to the selector. In various examples, the expression may be a logical expression that can be evaluated to true or false. For example, the expression may be "isTrue(x), x and y". If the expression is evaluated to true, then the selector may perform selection. If the expression is evaluated to be false, then the selector may not perform selection. In various examples, the expression may be used to control a flow by providing input to the expression. The graph-based masking policy 200B itself may thus correspond to a masking engine, which is represented by a collection of nodes and edges that collectively are able to perform a masking or unmasking operation on a payload. The graph-based masking policy 200B thus includes a node representing a first data processor 202E coupled to a node representing a second data processor 202F via a directed edge representing a data selector 204F. The graph-based masking policy 200B also includes a node representing a third data processor 202G coupled to the first data processor 202E via a directed edge representing a data selector 204G. The graph-based masking policy 200B includes a node representing a fourth data processor 202H coupled to the second data processor 202F via a directed edge representing a data selector 204H. The graph-based masking policy 200B includes a node representing a fifth data processor 202I coupled to the second data processor 202F via a directed edge representing a data selector 204I. The graph-based masking policy 200B includes a node representing a sixth data processor 202J coupled to the third data processor 202G via a directed edge representing a data selector 204J. The sixth data processor 202J is further coupled to the fifth data processor via a directed edge representing a data selector 204K. The graph-based masking policy 200B includes a node representing a masking processor 206 coupled to the fourth data processor 202H via a directed edge representing a selector 204L, coupled to the fifth data processor 202I via a directed edge representing a selector 204M, and coupled to the sixth data processor 202J via a directed edge representing a selector 204N.

In the example graph-based masking policy 200B, three different data objects may be masked in a composite payload that includes a number of different data types. For example, the data types may be XML, HTML, text, JSON, CSV, DOCX, among other suitable data types. The graph-based masking policy 200B has been configured based on the number and order of different data types and the data objects to be processed. In various examples, the graph-based masking policy 200B contains a single root node 202E where the processing begins and parses the payload based on the type of data of the payload. In various examples, each one of the directed edges 204F, 204G, 204G, 204H, 204I, 204J, 204K, 204L, 204M, and 204N representing selectors is used to specify how to extract the data segment from the relevant payload type. The extracted data segment is then provided to the next processor. For example, the relevant payload type of the extracted segment may be a table cell, XML text node, etc. In various examples, this process is applied repeatedly until a terminal node 206 is reached where masking is performed and result is returned. The graph-based masking policy 200B thus allows to specify gradual and stepwise selection from the root node on the left to the leaf nodes on the right of the graph-based masking policy 200B for each of any number of composite payloads. The final selections from nodes 202H, 202I and 202J can be transformed by the terminal node 206. For example, the terminal node 206 may be a masking processor that masks the received final selections of data segments. After masking, the flow of the process may proceed from the leaf nodes on the right to the root node on the left. In various examples, the transformed values are replaced in the original composite payload in place. For example, the relevant selection is replaced at each of the nodes 202E, 202F, 202G, 202H, 202I, and 202J corresponding to a data processor until the node 202E generates a complete masked payload.

In the particular example graph-based masking policy 200B, a number of nodes corresponding to data processors 202E, 202F, and 202J, are configured to send different data segments to multiple downstream nodes. For example, the second data processor 202F is configured to be coupled to the fourth data processor 202H and the fifth data processor 202I and may thus send different data segments via the data selector 204H and the data selector 204I depending on the relative address received from these data selectors. Similarly, the sixth data processor 202J is also configured to be coupled to the fifth data processor 202I and the masking processor 206, and can thus send a data segment to the fifth data processor 202I to be further processed into another data segment sent via the data selector 204M to the masking processor 206, in addition to sending a data segment directly to the masking processor 206 via the data selector 204N.

In addition, the fifth data processor 202I receives data segments from multiple data processors 202F and 202J and sends a processed data segment 204M to the masking processor 206 via the data selector 204M.

In various examples, the masking processor 206 receives data segments via data selectors 204L, 204M, and 204N from data processors 202H, 202I, and 202J, respectively, and returns masked data segments to the data processors 202H, 202I, and 202J via the same data selectors 204L, 204M, and 204N. The masked data segments may be masked in place in selected portions of early data segments to ultimately result in a masked payload from the first data processor 202E. For example, the data processor 202H may mask in place a selected portion of the data segment received from data selector 204H with the masked data segment from the data selector 204K. The data processor 202H may then send the masked data segment to the data processor 202F via the data selector 204H. The data processor 202F may then mask in place a portion of the original data segment received from the data selector 204F with the masked data segment from data selector 204H, in addition to a masked data segment from the data selector 204I. The data processor 204G can then send the masked data segment to the first data processor 202E via the data selector 204F. The first data processor 202E can then mask in place the masked data segment from data selector 204F along with a masked data segment from data selector 204G that was similarly processed by data processors 202G, 202I, and 202J. In this manner, various layers of different data types may be processed using a masking engine generated based on the graph-based masking policy 200B without the use of custom scripts or specialized algorithms to process text data.

It is to be understood that the block diagram of FIG. 2B is not intended to indicate that the graph-based masking policy 200B is to include all of the components shown in FIG. 2B. Rather, the graph-based masking policy 200B can include fewer or additional components not illustrated in FIG. 2B (e.g., additional nodes, or additional directed edges, etc.). For example, depending on the particular masking policy received, the graph-based masking policy 200B may include any combination of various nodes corresponding to any combination of different data processors and directed edges corresponding to data selectors for various data types present in the composite payload. For example, the graph-based masking policy 200B can have two or more root nodes. In some examples, each of the root nodes may be connected to multiple data processors. In various examples, each of the data processors may have multiple inputs from multiple directed edges and multiple outputs to multiple directed edges. Furthermore, in some examples, a node representing a masking processor may have multiple inputs. Such nodes are terminal nodes in the graph and are not connected to other processors.

Figure 3:
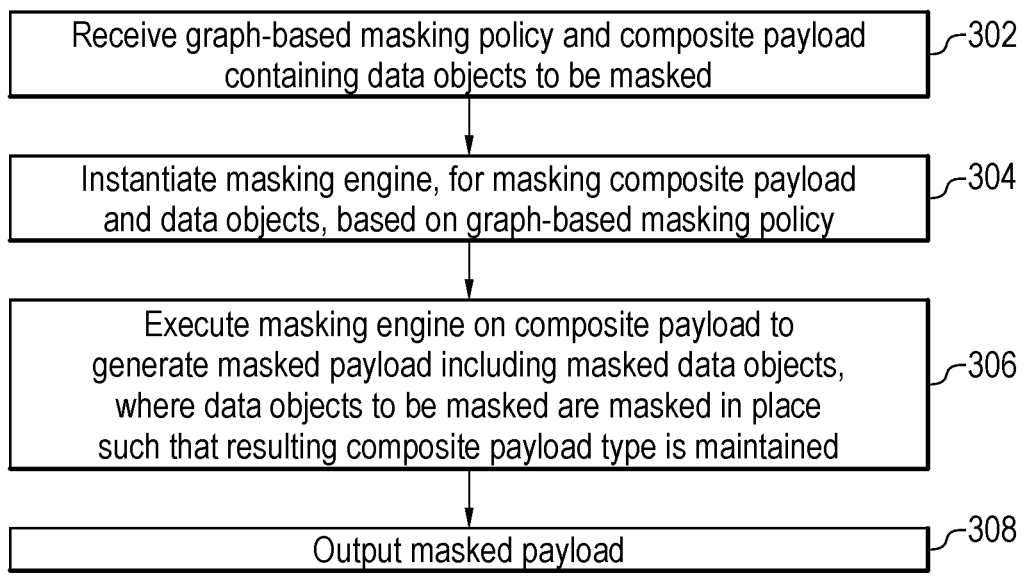
FIG. 3 is a block diagram of an example method that can mask composite payloads using graph-based masking policies.

FIG. 3 is a process flow diagram of an example method that can mask composite payloads using graph-based masking policies. The method 300 can be implemented with any suitable computing device, such as the computing device 400 of FIG. 4 and is described with reference to the masking engine of FIG. 1. For example, the methods described below can be implemented by the processor 402 or the processor 702 of FIGS. 4 and 7.

At block 302, a processor receives a graph-based masking policy and a composite payload containing a data object to be masked. For example, the masking policy may include information indicating where and how the data object is to be masked. In various examples, the composite payload may include a number of layers of different data types.

At block 304, the processor instantiates a masking engine, for masking the composite payload and the data object, based on the graph-based masking policy. In various examples, the processor, based on the graph-based masking policy, can configure the masking engine to process the composite payload at a root node to parse the composite payload based on the type of the data of the composite payload and extract a relevant portion of the composite payload to a subsequent data processor based on information provided by a coupled selector. In some examples, the processor can configure the masking engine to extract a relevant portion of the composite payload based on a location of the data object to be masked using context based detection. In some examples, the processor can configure the masking engine to extract a relevant portion of the composite payload based on a structure of the data object using content based detection. In some examples, the processor can configure the masking engine to extract a relevant portion of the composite payload based on both context based detection and content based detection. In various examples, the processor can configure the masking engine to mask a data segment received from a data processor at a masking processor of the masking engine and transmit a masked data segment to the data processor for replacement in place of the data segment. In some examples, the processor can configure the masking engine to receive at each data processor of the masking engine a returned masked value from a subsequently coupled selector and replace in place a previously selected data of the data segment processed at each data processor with the returned masked value.

At block 306, the processor executes the masking engine on the composite payload to generate a masked payload including masked data objects, where the data objects to be masked are masked in place such that the resulting composite payload type is maintained. In various examples, the processor executes the masking engine on the composite payload to generate a masked payload including any number of masked data objects.

At block 308, the processor outputs the masked payload. For example, the masked payload may be transmitted to an application for use as test data.

The process flow diagram of FIG. 3 is not intended to indicate that the operations of the method 300 are to be executed in any particular order, or that all of the operations of the method 300 are to be included in every case. Additionally, the method 300 can include any suitable number of additional operations.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
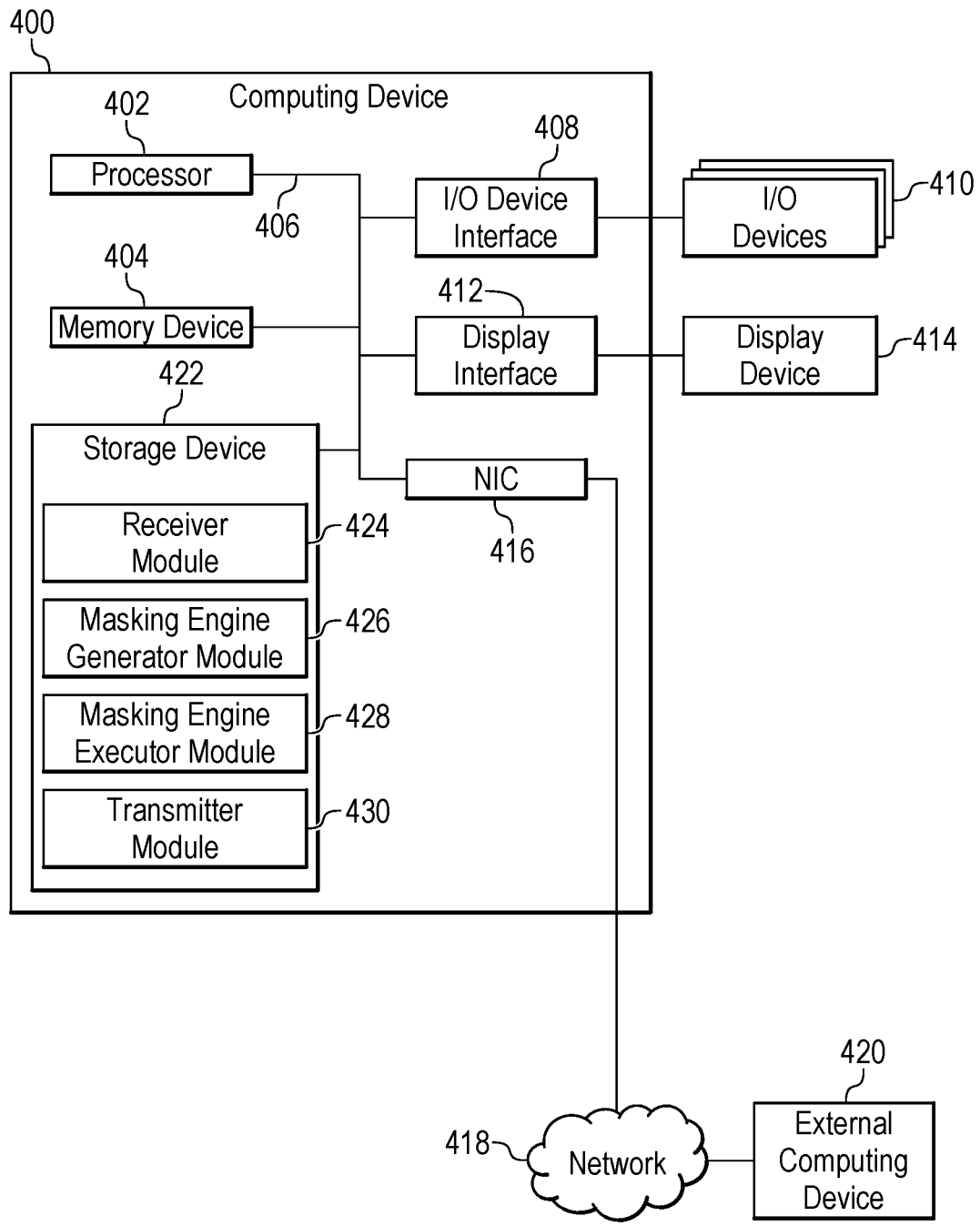
FIG. 4 is a block diagram of an example computing device that can mask composite payloads using graph-based masking policies.

FIG. 4 is block diagram of an example computing device that can mask composite payloads using policy graphs. The computing device 400 may be for example, a server, desktop computer, laptop computer, tablet computer, or smartphone. In some examples, computing device 400 may be a cloud computing node. Computing device 400 may be described in the general context of computer system executable instructions, such as program modules, being executed by a computer system. Generally, program modules may include routines, programs, objects, components, logic, data structures, and so on that perform particular tasks or implement particular abstract data types. Computing device 400 may be practiced in distributed cloud computing environments where tasks are performed by remote processing devices that are linked through a communications network. In a distributed cloud computing environment, program modules may be located in both local and remote computer system storage media including memory storage devices.

The computing device 400 may include a processor 402 that is to execute stored instructions, a memory device 404 to provide temporary memory space for operations of said instructions during operation. The processor can be a single-core processor, multi-core processor, computing cluster, or any number of other configurations. The memory 404 can include random access memory (RAM), read only memory, flash memory, or any other suitable memory systems.

The processor 402 may be connected through a system interconnect 406 (e.g., PCI®, PCI-Express®, etc.) to an input/output (I/O) device interface 408 adapted to connect the computing device 400 to one or more I/O devices 410. The I/O devices 410 may include, for example, a keyboard and a pointing device, wherein the pointing device may include a touchpad or a touchscreen, among others. The I/O devices 410 may be built-in components of the computing device 400, or may be devices that are externally connected to the computing device 400.

The processor 402 may also be linked through the system interconnect 406 to a display interface 412 adapted to connect the computing device 400 to a display device 414. The display device 414 may include a display screen that is a built-in component of the computing device 400. The display device 414 may also include a computer monitor, television, or projector, among others, that is externally connected to the computing device 400. In addition, a network interface controller (NIC) 416 may be adapted to connect the computing device 400 through the system interconnect 406 to the network 418. In some embodiments, the NIC 416 can transmit data using any suitable interface or protocol, such as the internet small computer system interface, among others. The network 418 may be a cellular network, a radio network, a wide area network (WAN), a local area network (LAN), or the Internet, among others. An external computing device 420 may connect to the computing device 400 through the network 418. In some examples, external computing device 420 may be an external webserver 420. In some examples, external computing device 420 may be a cloud computing node.

The processor 402 may also be linked through the system interconnect 406 to a storage device 422 that can include a hard drive, an optical drive, a USB flash drive, an array of drives, or any combinations thereof. In some examples, the storage device may include a receiver module 424, a masking engine generator module 426, a masking engine executor module 428, and a transmitter module 430. The receiver module 424 can receive a graph-based masking policy and a composite payload containing a data object to be masked. For example, the composite payload may include any number of data different data types. In some examples, the composite payload includes a number of nested payload types. For example, a composite payload may be a JSON payload within an XML payload within another outer JSON payload. The masking engine generator 426 can generate a masking engine for the composite payload and the data object based on a policy graph instantiated using the masking policy. For example, the masking engine may include a number of data processors coupled to a number of selectors. Each of the data processors may be configured to process a particular type of data in a predetermined manner and each of the selectors is configured to identify to an associated data processor a relative location of a portion of the composite payload to be extracted at the associated data processor. In various examples, an identification of the data object to be masked in the composite payload is based on a series of context identification selectors, content identification selectors, or a combination of both. For example, context identification selectors may include Jpath or Xpath. Content identification selectors may include regular expressions or dictionaries. In various examples, each node in the graph-based masking policy handles a different data layer of the composite payload and corresponds to a data processor in the masking engine. In some examples, a first data processor of the masking engine is connected to a second data processor processing a lower layer of the composite payload via a selector that provides the first data processor a specified relative path for a payload portion to be extracted. In various examples, each edge in the graph-based masking policy corresponds to a selector in the masking engine that receives a payload portion of the composite payload from a previous node and transmits a sub-portion of the received payload portion to a subsequent node. Each edge receives in return, from the subsequent node, a corresponding masked sub-portion of the payload and replaces the masked sub-portion in place to create a masked payload portion to transmit back to the previous node. In various examples, the masking engine includes a masking processor coupled to a data processor. For example, the masking processor is to receive the data object from the data processor, mask the data object, and transmit the data object back to the data processor for masking in place in a data segment processed by the data processor. In various examples, an order of processing, selection and masking is to be determined based on the graph-based masking policy. In some examples, a processing flow of the masking engine is controlled based on a received external parameter. For example, the received external parameter may be a value such as "encrypt" or "decrypt." In some examples, a processing flow of the masking engine is controlled based on a received payload-specific parameter. For example, the payload-specific parameter may be an XMPL tag containing the value "consent exists." In various examples, the processing flow of the masking engine may be controlled based on any combination of a received payload-specific parameter and a received external parameter. The masking engine executor module 428 can execute the masking engine on the composite payload to generate a masked payload including a masked data object. In some examples, the masking engine executor module 428 can execute the masking engine on the composite payload to generate a masked payload including a number of masked data objects. In some examples, the executed masking engine can perform any number of masking actions on a data object. In some examples, the executed masking engine is to perform a masking action on any number of data objects. In various examples, a validity of the composite payload type is maintained in the masked payload after masking the data object. For example, a masked word processing document may be a valid word processing document after the masking, and thus maintain any format restrictions. The transmitter module 430 can output the masked payload.

It is to be understood that the block diagram of FIG. 4 is not intended to indicate that the computing device 400 is to include all of the components shown in FIG. 4. Rather, the computing device 400 can include fewer or additional components not illustrated in FIG. 4 (e.g., additional memory components, embedded controllers, modules, additional network interfaces, etc.). Furthermore, any of the functionalities of the receiver module 424, the masking engine generator module 426, the masking engine executor module 428, and the transmitter module 430, may be partially, or entirely, implemented in hardware and/or in the processor 402. For example, the functionality may be implemented with an application specific integrated circuit, logic implemented in an embedded controller, or in logic implemented in the processor 402, among others. In some embodiments, the functionalities of the receiver module 424, the masking engine generator module 426, the masking engine executor module 428, and the transmitter module 430 can be implemented with logic, wherein the logic, as referred to herein, can include any suitable hardware (e.g., a processor, among others), software (e.g., an application, among others), firmware, or any suitable combination of hardware, software, and firmware.

Figure 5:
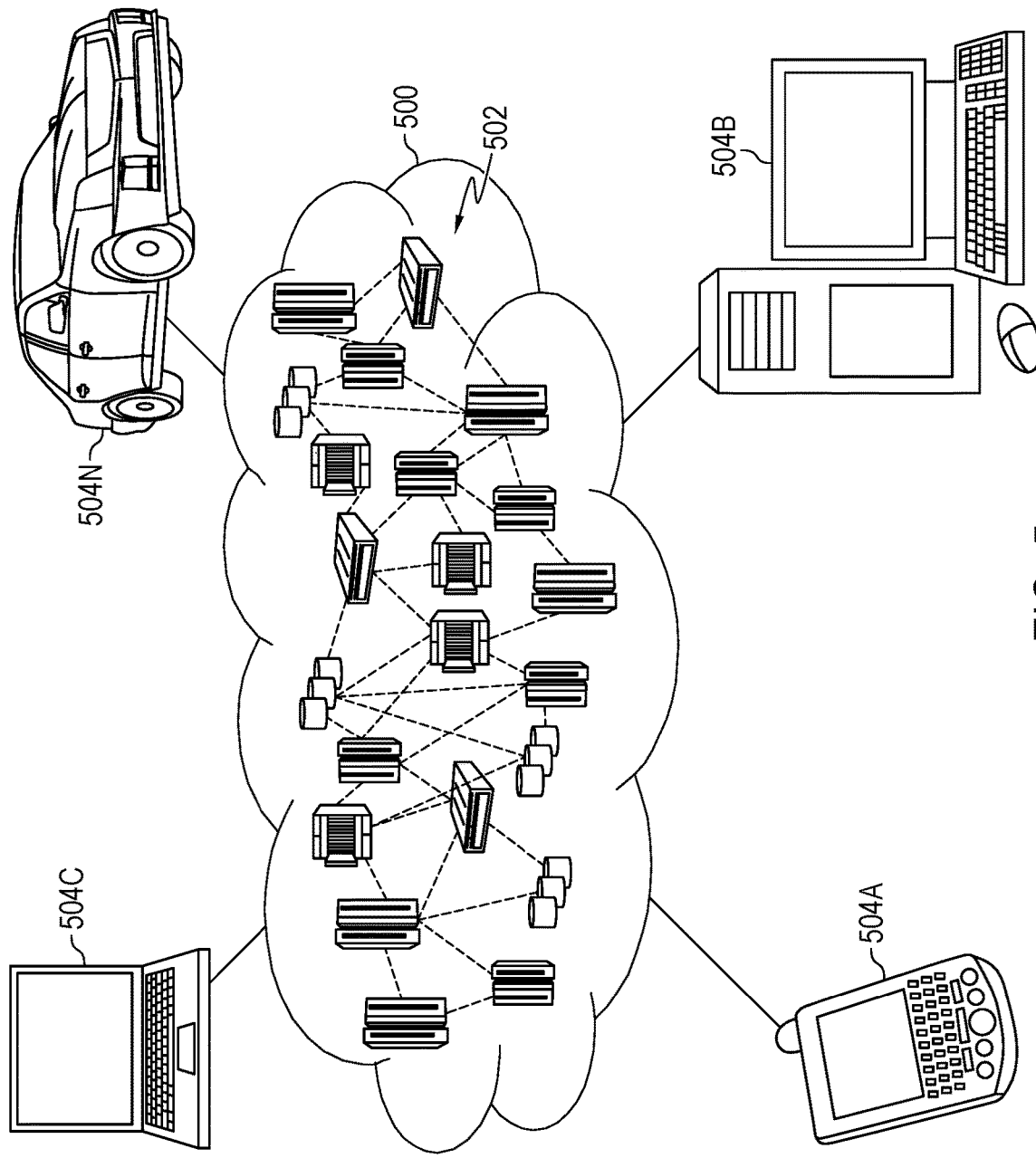
FIG. 5 is a diagram of an example cloud computing environment according to embodiments described herein.

Referring now to FIG. 5, illustrative cloud computing environment 500 is depicted. As shown, cloud computing environment 500 includes one or more cloud computing nodes 502 with which local computing devices used by cloud consumers, such as, for example, personal digital assistant (PDA) or cellular telephone 504A, desktop computer 504B, laptop computer 504C, and/or automobile computer system 504N may communicate. Nodes 502 may communicate with one another. They may be grouped (not shown) physically or virtually, in one or more networks, such as Private, Community, Public, or Hybrid clouds as described hereinabove, or a combination thereof. This allows cloud computing environment 500 to offer infrastructure, platforms and/or software as services for which a cloud consumer does not need to maintain resources on a local computing device. It is understood that the types of computing devices 504A-N shown in FIG. 5 are intended to be illustrative only and that computing nodes 502 and cloud computing environment 500 can communicate with any type of computerized device over any type of network and/or network addressable connection (e.g., using a web browser).

Figure 6:
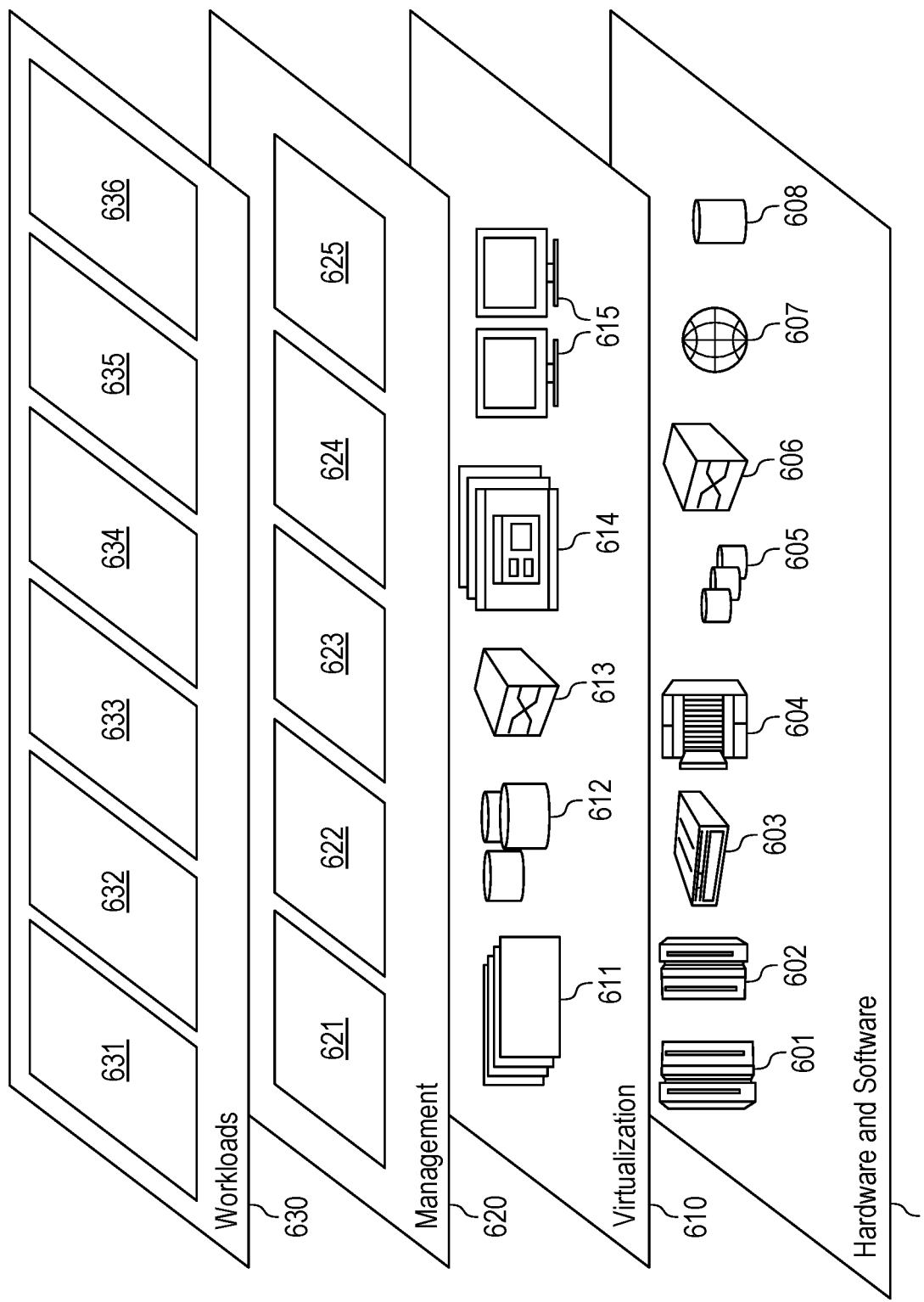
FIG. 6 is a diagram of an example abstraction model layers according to embodiments described herein.

Referring now to FIG. 6, a set of functional abstraction layers provided by cloud computing environment 500 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 600 includes hardware and software components. Examples of hardware components include: mainframes 601; RISC (Reduced Instruction Set Computer) architecture based servers 602; servers 603; blade servers 604; storage devices 605; and networks and networking components 606. In some embodiments, software components include network application server software 607 and database software 608.

Virtualization layer 610 provides an abstraction layer from which the following examples of virtual entities may be provided: virtual servers 611; virtual storage 612; virtual networks 613, including virtual private networks; virtual applications and operating systems 614; and virtual clients 615.

In one example, management layer 620 may provide the functions described below. Resource provisioning 621 provides dynamic procurement of computing resources and other resources that are utilized to perform tasks within the cloud computing environment. Metering and Pricing 622 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 623 provides access to the cloud computing environment for consumers and system administrators. Service level management 624 provides cloud computing resource allocation and management such that required service levels are met. Service Level Agreement (SLA) planning and fulfillment 625 provide pre-arrangement for, and procurement of, cloud computing resources for which a future requirement is anticipated in accordance with an SLA.

Workloads layer 630 provides examples of functionality for which the cloud computing environment may be utilized. Examples of workloads and functions which may be provided from this layer include: mapping and navigation 631; software development and lifecycle management 632; virtual classroom education delivery 633; data analytics processing 634; transaction processing 635; and composite payload masking 636.

The present invention may be a system, a method and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the techniques. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 7:
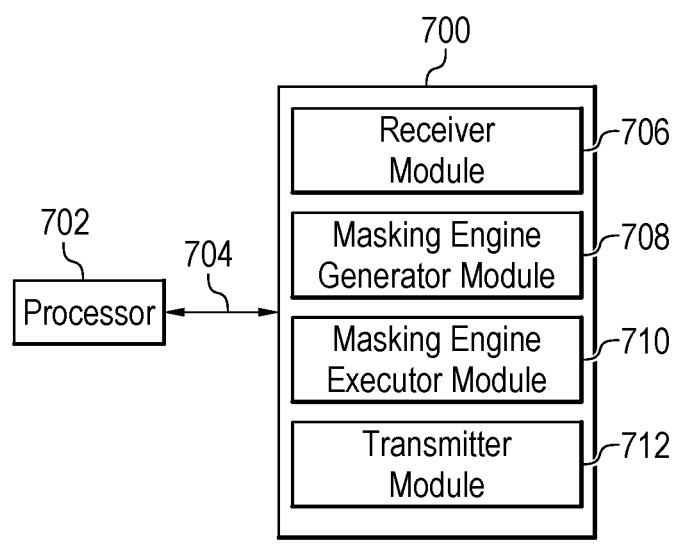
FIG. 7 is an example tangible, non-transitory computer-readable medium that can mask composite payloads using graph-based masking policies.

Referring now to FIG. 7, a block diagram is depicted of an example tangible, non-transitory computer-readable medium 700 that can mask composite payloads using policy graphs. The tangible, non-transitory, computer-readable medium 700 may be accessed by a processor 702 over a computer interconnect 704. Furthermore, the tangible, non-transitory, computer-readable medium 700 may include code to direct the processor 702 to perform the operations of the method 300 of FIG. 3.

The various software components discussed herein may be stored on the tangible, non-transitory, computer-readable medium 700, as indicated in FIG. 7. For example, a receiver module 706 includes code to receive a masking policy and a composite payload containing a data object to be masked. A masking engine generator module 708 includes code to generate a masking engine for the composite payload and the data object based on a policy graph instantiated based on the masking policy. The masking engine generator module 708 further includes code to configure the masking engine to process the composite payload at a root node to parse the composite payload based on the type of the data of the composite payload and extract a relevant portion of the composite payload to a subsequent data processor based on information provided by a coupled selector. In various examples, the masking engine generator module 708 also includes code to configure the masking engine to extract a relevant portion of the composite payload based on a location of the data object to be masked using context based detection. In some examples, the masking engine generator module 708 includes code to configure the masking engine to extract a relevant portion of the composite payload based on a structure of the data object using content based detection. The masking engine generator module 708 also includes code to configure the masking engine to mask a data segment received from a data processor at a masking processor of the masking engine and transmit a masked data segment to the data processor for replacement in place of the data segment. In various examples, the masking engine generator module 708 includes code to configure the masking engine to receive at each data processor of the masking engine a returned masked value from a subsequently coupled selector and replace in place a previously selected data of the data segment processed at each data processor with the returned masked value. A masking engine executor module 710 includes code to execute the masking engine on the composite payload to generate a masked payload including a masked data object. The masking engine executor module 710 includes code to generate a masked payload including a number of masked data objects. A transmitter module 712 includes code to output the masked payload.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. It is to be understood that any number of additional software components not shown in FIG. 7 may be included within the tangible, non-transitory, computer-readable medium 700, depending on the specific application.

The descriptions of the various embodiments of the present techniques have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising a processor to:
   receive a graph-based masking policy and a composite payload containing a data object to be masked;
   instantiate a masking engine based on the graph-based masking policy;
   execute the masking engine on the composite payload to generate a masked payload comprising a masked data object; wherein the data object is masked in place such that a resulting composite payload type is maintained, and wherein executing the masking engine comprises processing the composite payload at a root node to parse the composite payload based on a type of the composite payload; and
   output the masked payload.

2. The system of claim 1, wherein a validity of the composite payload type is maintained in the masked payload after masking the data object.

3. The system of claim 1, wherein the composite payload comprises a plurality of data different data types.

4. The system of claim 1, wherein the composite payload comprises a plurality of nested payload types.

5. The system of claim 1, wherein the masking engine comprises a plurality of data processors coupled to a plurality of selectors, wherein each of the data processors is configured to process a particular type of data in a predetermined manner and each of the selectors is configured to identify to an associated data processor a relative location of a portion of the composite payload to be extracted at the associated data processor.

6. The system of claim 1, wherein an identification of the data object to be masked in the composite payload is based on a series of context identification selectors, content identification selectors, or a combination of both.

7. The system of claim 1, wherein each node in the graph-based masking policy handles a different data layer of the composite payload and corresponds to a data processor in the masking engine.

8. The system of claim 1, wherein a first data processor of the masking engine is connected to a second data processor processing a lower layer of the composite payload via a selector that provides the first data processor a specified relative path for a payload portion to be extracted.

9. The system of claim 1, wherein each edge in the graph-based masking policy corresponds to a selector in the masking engine that receives a payload portion of the composite payload from a previous node and transmits a sub-portion of the received payload portion to a subsequent node, and receives in return, from the subsequent node, a corresponding masked sub-portion of the payload portion and replaces the masked sub-portion in place to create a masked payload portion to transmit back to the previous node.

10. The system of claim 1, wherein the masking engine comprises a masking processor coupled to a data processor, wherein the masking processor is to receive the data object from the data processor, mask the data object, and transmit the data object back to the data processor for masking in place in a data segment processed by the data processor.

11. The system of claim 1, wherein the executed masking engine is to perform a plurality of masking actions on the data object.

12. The system of claim 1, wherein the executed masking engine is to perform a masking action on a plurality of data objects.

13. The system of claim 1, wherein an order of processing, selection and masking is to be determined based on the graph-based masking policy.

14. The system of claim 1, wherein a processing flow of the masking engine is controlled based on a received external parameter.

15. The system of claim 1, wherein a processing flow of the masking engine is controlled based on a received payload-specific parameter.

16. The system of claim 1, wherein the processing flow of the masking engine is controlled based on a combination of a received payload-specific parameter and a received external parameter.

17. A computer-implemented method, comprising:
receiving, via a processor, a graph-based masking policy and a composite payload containing a data object to be masked;
instantiating, via the processor, a masking engine based on the graph-based masking policy;
executing, via the processor, the masking engine on the composite payload to generate a masked payload comprising a masked data object, wherein the data object is masked in place such that a resulting composite payload type is maintained, and wherein executing the masking engine comprises processing the composite payload at a root node to parse the composite payload based on a type of the composite payload; and
outputting, via the processor, the masked payload.

18. The computer-implemented method of claim 17, further comprising configuring the masking engine to process the composite payload at a root node to extract a relevant portion of the composite payload to a subsequent data processor based on information provided by a coupled selector.

19. The computer-implemented method of claim 17, wherein generating the masking engine comprises configuring the masking engine to extract a relevant portion of the composite payload based on a location of the data object to be masked using context based detection.

20. The computer-implemented method of claim 17, wherein generating the masking engine comprises configuring the masking engine to extract a relevant portion of the composite payload based on a structure of the data object using content based detection.

21. The computer-implemented method of claim 17, wherein generating the masking engine comprises configuring the masking engine to mask a data segment received from a data processor at a masking processor of the masking engine and transmit a masked data segment to the data processor for replacement in place of the data segment.

22. The computer-implemented method of claim 17, wherein generating the masking engine comprises configuring the masking engine to receive at each data processor of the masking engine a returned masked value from a subsequently coupled selector and replace in place a previously selected data of the data segment processed at each data processor with the returned masked value.

23. The computer-implemented method of claim 17, wherein executing the masking engine generates a masked payload comprising a plurality of masked data objects.

24. A computer program product for masking composite payloads, the computer program product comprising a computer-readable storage medium having program code embodied therewith, wherein the computer-readable storage medium is not a transitory signal per se, the program code executable by a processor to cause the processor to:
receive a graph-based masking policy and a composite payload containing a data object to be masked;
initiate a masking engine based on the graph-based masking policy;
execute the masking engine on the composite payload to generate a masked payload comprising a masked data object; wherein the data object is masked in place such that a resulting composite payload type is maintained, and wherein executing the masking engine comprises processing the composite payload at a root node to parse the composite payload based on a type of the composite payload; and
output the masked payload.

25. The computer program product of claim 24, further comprising program code executable by the processor to configure the masking engine to process the composite payload at the root node to extract a relevant portion of the composite payload to a subsequent data processor based on information provided by a coupled selector.

* * * * *